(12) United States Patent
Peng

(10) Patent No.: US 9,183,162 B2
(45) Date of Patent: Nov. 10, 2015

(54) ELECTRONIC DEVICE CAPABLE OF BEING DEBUGGED VIA EARPHONE PORT

(71) Applicant: ShenZhen Goldsun Network Intelligence Technology Co., Ltd., Shenzhen (CN)

(72) Inventor: Xiao-Zhan Peng, Shenzhen (CN)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 39 days.

(21) Appl. No.: 14/183,901

(22) Filed: Feb. 19, 2014

(65) Prior Publication Data
US 2014/0380103 A1   Dec. 25, 2014

(30) Foreign Application Priority Data
Jun. 21, 2013   (CN) .......................... 2013 1 0247961

(51) Int. Cl.
G06F 11/07     (2006.01)
G06F 13/00     (2006.01)
G06F 11/22     (2006.01)

(52) U.S. Cl.
CPC ................ *G06F 13/00* (2013.01); *G06F 11/22* (2013.01)

(58) Field of Classification Search
CPC ....... G06F 11/22; G06F 13/00; A61B 5/6898; A61B 5/72; A61B 5/742
See application file for complete search history.

(56) References Cited

U.S. PATENT DOCUMENTS

| 7,876,911 | B2 * | 1/2011 | Felder et al. | ..................... 381/74 |
| 2009/0287327 | A1 * | 11/2009 | Hsu et al. | ........................ 700/94 |
| 2013/0279725 | A1 * | 10/2013 | Ren et al. | ...................... 381/309 |

* cited by examiner

*Primary Examiner* — Nadeem Iqbal
(74) *Attorney, Agent, or Firm* — Novak Druce Connolly Bove + Quigg LLP

(57) ABSTRACT

An electronic device includes an earphone port, an audio amplifier, a digital processor, a multi-way selection switch, and an earphone detection response circuit. The earphone port includes left and right channel pins. The audio amplifier includes an earphone left channel output pin and an earphone right channel output pin. The digital processor includes a data transmission pin and a data receive pin. The multi-way selection switch includes four switches electrically connected between the data transmitting pin and the left channel pin, the data receive pin and the right channel pin, the earphone left channel output pin and the left channel pin, and the earphone right channel output pin and the right channel pin, respectively. The earphone detection response circuit turns on a first switch and a second switch, and turns off a third switch and a fourth switch when the earphone port does not receive an earphone.

11 Claims, 2 Drawing Sheets

ELECTRONIC DEVICE CAPABLE OF BEING DEBUGGED VIA EARPHONE PORT

FIELD

The present disclosure relates to electronic devices, and particularly to an electronic device capable of being debugged via an earphone port of the electronic device.

BACKGROUND

Electronic devices, such as mobile phones and tablet computers, often need to be debugged when software of the electronic device is updated or broken. However, a debug port used to debug the electronic device is often covered by a casing of the electronic device, so the casing needs to be opened to debug the electronic device, which is inconvenient.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Embodiments of the present disclosure will be described with reference to the accompanying drawings.

Figure 1:
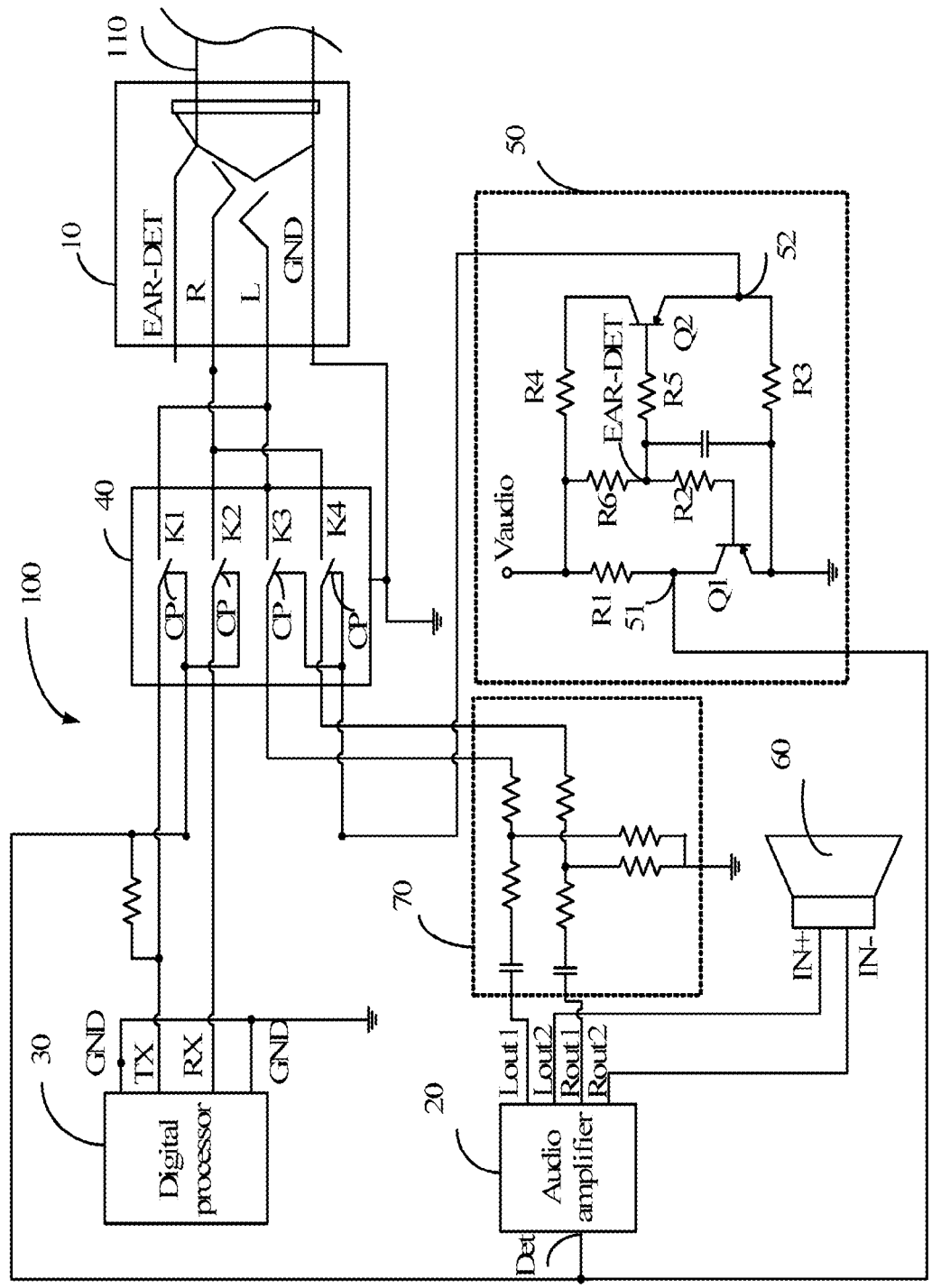
FIG. 1 is a circuit diagram of an embodiment of an electronic device capable of being debugged via an earphone port.

FIG. 1 shows an embodiment of an electronic device 100. The electronic device 100 includes an earphone port 10, an audio amplifier 20, a digital processor 30, a multi-way selection switch 40, and an earphone detection and response circuit 50. The electronic device 100 is capable of being debugged via the earphone port 10.

The earphone port 10 includes a left channel pin L, a right channel pin R, an earphone detection pin EAR-DET, and a ground pin GND. The earphone port 10 is used to receive an earphone plug 110.

The multi-way selection switch 40 includes a number of switches, such as a first switch K1, a second switch K2, a third switch K3, and a fourth switch K4. The first switch K1, the second switch K2, the third switch K3, and the fourth switch K4 each includes a controlled port CP. For example, each of the switches K1, K2, K3, K4 is a Complementary Metal Oxide Semiconductor (CMOS) transmission gate.

The audio amplifier 20 includes an earphone left channel output pin Lout1 and an earphone right channel output pin Rout1. The digital processor 30 includes a data transmission pin TX and a data receive pin RX.

The first switch K1 is electrically connected between the data transmission pin TX of the digital processor 30, and the left channel pin L of the earphone port 10, and establishes or cuts off a connection between the data transmission pin TX and the left channel pin L. The second switch K2 is electrically connected between the data receive pin RX of the digital processor 30, and the right channel pin R of the earphone port 10, and establishes or cuts off a connection between the data receive pin RX and the right channel pin R.

The third switch K3 is electrically connected between the earphone left channel output pin Lout1 of the audio amplifier 20, and the left channel pin L of the earphone port 10, and establishes or cuts off a connection between the earphone left channel output pin Lout1 and the left channel pin L. The fourth switch K4 is electrically connected between the earphone right channel output pin Rout1 of the audio amplifier 20, and the right channel pin R of the earphone port 10, and establishes or cuts off a connection between the earphone right channel output pin Rout1 and the right channel pin R.

The earphone detection and response circuit 50 detects whether the earphone port 10 receives the earphone plug 110. The earphone detection and response circuit 50 includes a first output port 51 and a second output port 52. The first output port 51 is electrically connected to the controlled ports CP of the first switch K1 and the second switch K2, and the second output port 52 is electrically connected to the controlled ports CP of the third switch K3 and the fourth switch K4.

When the earphone detection and response circuit 50 detects that the earphone port 10 does not receive the earphone plug 110, the earphone detection and response circuit 50 outputs a first control signal to the controlled ports CP of the first switch K1 and the second switch K2 via the first output port 51 to turn on the first switch K1 and the second switch K2. At the same time, the earphone detection and response circuit 50 outputs a second control signal to the controlled ports CP of the third switch K3 and the fourth switch K4 via the second output port 52 to turn off the third switch K3 and the fourth switch K4.

Therefore, when the earphone port 10 does not receive the earphone plug 110, the data transmission pin TX and the data receive pin RX of the digital processor 30 are respectively connected to the left channel pin L and the right channel pin R of the earphone port 10 via the first switch K1 and the second switch K2. Because the third switch K3 and the fourth switch K4 are turned off, the connection between the audio amplifier 20 and the earphone port 10 is cut off.

When the earphone port 10 does not receive the earphone 110, the electronic device 100 can be debugged via the earphone port 10 by an external debugging device (not shown) having a debugging connector (200 in FIG. 2) being received in the earphone port 10 to communicate with the digital processor 30.

When the earphone detection and response circuit 50 detects that the earphone port 10 receives the earphone plug 110, the earphone detection and response circuit 50 outputs the second control signal to the controlled ports CP of the first switch K1 and the second switch K2 via the first output port 51 to turn off the first switch K1 and the second switch K2. Thus, the connection between the digital processor 30 and the audio port 10 is cut off. At the same time, the earphone detection and response circuit 50 outputs the first control signal to the controlled ports CP of the third switch K3 and the fourth switch K4 via the second output port 52 to turn on the third switch K3 and the fourth switch K4.

Therefore, the earphone left channel output pin Lout1 and the earphone right channel output pin Rout1 of the audio amplifier 20 are respectively connected to the left channel pin L and the right channel pin R of the earphone port 10 via the third switch K3 and the fourth switch K4. The connection between the digital processor 30 and the audio port 10 is cut off now because the first switch K1 and the switch K2 are turned off.

When the earphone port 10 receives the earphone plug 110, audio signals output by the earphone left channel output pin Lout1 and the earphone right channel output pin Rout1 of the audio amplifier 20 are transmitted to the earphone port 10. Thus, the earphone plug 110 receives the audio signals as normal.

In the embodiment, the electronic device 100 further includes a loudspeaker 60, and the audio amplifier 20 further includes a detection port Det, a loudspeaker left channel output pin Lout2, and a loudspeaker right channel output pin Rout2. The detection port Det is electrically connected to the first output port 51 of the earphone detection and response circuit 50. The loudspeaker 60 includes audio input pins IN+, IN−. The loudspeaker left channel output pin Lout2 and the loudspeaker right channel output pin Rout2 of the audio amplifier 20 are respectively connected to the audio input pins IN+, IN− of the loudspeaker 60.

In one embodiment, when the detection port Det receives the first control signal from the first output port 51 of the earphone detection and response circuit 50, the audio amplifier 20 controls the loudspeaker left channel output pin Lout2 and the loudspeaker right channel output pin Rout2 to output the audio signals to the loudspeaker 60. At this time, because the earphone plug 110 is not received in the earphone port 10, the electronic device 100 can output the audio signals via the loudspeaker 60.

When the detection port Det receives the second control signal from the second output port 52 of the earphone detection and response circuit 50, the audio amplifier 20 also controls the earphone left channel output pin Lout1 and the earphone right channel output pin Rout1 to output the audio signals to the earphone port 10. At this time, the electronic device 100 outputs the audio signals via the earphone 110.

In the embodiment, the electronic device 100 also includes an earphone filtering circuit 70. The earphone filtering circuit 70 is electrically connected between the earphone left channel output pin Lout1 and the earphone right channel output pin Rout1 of the audio amplifier 20 the third switch K3 and the fourth switch K4, the earphone filtering circuit 70 filters the audio signals output by the earphone left channel output pin Lout1 and the earphone right channel output pin Rout1.

In detail, as shown in FIG. 1, the earphone detection and response circuit 50 includes a first positive-negative-positive (PNP) bipolar junction transistor (BJT) Q1 and a second PNP BJT Q2. An emitter of the first PNP BJT Q1 is grounded, a collector of the first PNP BJT Q1 is electrically connected to a voltage port Vaudio via a resistor R1, and a base of the first PNP BJT Q1 is electrically connected to the earphone detection pin EAR-DET of the earphone port 10 via a resistor R2. An emitter of the second PNP BJT Q2 is grounded via a resistor R3, a collector of the second PNP BJT Q2 is electrically connected to the voltage port Vaudio via a resistor R4, and a base of the second PNP BJT Q2 is electrically connected to the earphone detection pin EAR-DET of the earphone port 10 via a resistor R5. The voltage port Vaudio obtains a high voltage, such as 5 volts (V), from a power source (not shown), such as a battery of the electronic device 100. In this example, the high voltage is negative with respect to ground, and for this reason the transistors Q1 and Q2 are PNP transistors instead of NPN transistors.

The earphone detection pin EAR-DET of the earphone port 10 is also electrically connected to the voltage port Vaudio via a resistor R6. Therefore, when the earphone port 10 does not receive the earphone plug 110, the earphone detection pin EAR-DET obtains the high voltage.

When the earphone plug 110 is received into the earphone port 10, the earphone 110 electrically connects the earphone detection pin EAR-DET to the ground pin GND. Thus, the earphone detection pin EAR-DET obtains a low voltage.

A connection node between the collector of the first PNP BJT Q1 and the resistor R1 constitutes the first output port 51 of the earphone detection and response circuit 50. A connection node between the emitter of the second PNP BJT Q2 and the resistor R3 constitutes the second output port 52 of the earphone detection and response circuit 50.

In the embodiment, the first control signal output by the earphone detection and response circuit 50 is a high-voltage signal, and the second control signal output by the earphone detection and response circuit 50 is a low-voltage signal. The first switch K1, the second switch K2, the third switch K3, and the fourth switch K4 are turned on when the corresponding controlled ports CP receive the high-voltage signal, and are turned off when the corresponding controlled ports CP receive the low-voltage signal. As described above, when the earphone plug 110 is not received into the earphone port 10, the earphone detection pin EAR-DET obtains the high voltage. Thus, the bases of the first PNP BJT Q1 and the second PNP BJT Q2 obtain the high voltage from the earphone detection pin EAR-DET, and the first PNP BJT Q1 and the second PNP BJT Q2 are turned off accordingly.

When the earphone detection pin EAR-DET obtains the high voltage, the first output port 51 is electrically connected to the voltage port Vaudio and obtains the high voltage. Thus, the first output port 51 outputs the first control signal with the high voltage. The second output port 52 is grounded via the resistor R3 and obtains the low voltage. Thus, the second output port 52 outputs the second control signal with the low voltage.

Figure 2:
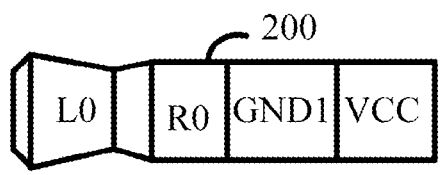
FIG. 2 is a schematic diagram of an embodiment of a debugging connector used to connect to an earphone port of the electronic device of FIG. 1.

FIG. 2 shows an embodiment of a debugging connector 200. The debugging connector 200 includes data pins L0, R0, a ground pin GND1, and a voltage pin VCC. When the debugging connector 200 is received in the earphone port 10, the data pins L0, R0, the ground pin GND1, and the voltage pin VCC are connected to the left channel pin L, the right channel pin R, the ground pin GND, and the earphone detection pin EAR-DET of the earphone port 10, respectively.

Therefore, when the data transmission pin TX and the data receive pin RX of the digital processor 30 are respectively connected to the left channel pin L and the right channel pin R of the earphone port 10 via the first switch K1 and the second switch K2, and when the debugging connector 200 is received into the earphone port 10, the data pins L0, R0 of the debugging connector 200 are respectively connected the data transmission pin TX and the data receive pin RX via the left channel pin L and the right channel pin R of the earphone port 10. Thus, a debugging device (not shown) with the debugging connector 200 can communicate with the digital processor 30 and debug the electronic device 100. In one embodiment, the debugging device is a computer.

In another embodiment, the debugging connector 200 includes two conductive strips. The two conductive strips are used to respectively connect to the left channel pin L and the right channel pin R of the earphone port 10, thereby connecting the debug device to the debugging connector 200 with the digital processor 30.

As described above, the audio amplifier 20 controls the loudspeaker left channel output pin Lout2 and the loudspeaker right channel output pin Rout2 to output the audio signals to the loudspeaker 60 when the detection port Det receives the first control signal with the high voltage from the first output port 51 of the earphone detection and response circuit 50. Thus, the electronic device 100 outputs the audio signals via the loudspeaker 60.

When the earphone 110 is received into the earphone port 10, the earphone detection pin EAR-DET is grounded via the earphone 10 and obtains the low voltage. At this time, the bases of the first PNP BJT Q1 and the second PNP BJT Q2 obtain the low voltage from the earphone detection pin EAR-DET. Thus the first PNP BJT Q1 and the second PNP BJT Q2 are turned on accordingly.

Therefore, the first output port 51 is grounded via the first PNP BJT Q1. Thus, the first output port 51 outputs the second control signal with the low voltage. The second output port 52 is electrically connected to the voltage port Vaudio via the resistor R4 and the second PNP BJT Q2 which is turned on and at the high voltage. Thus, the second output port 52 outputs the first control signal with the high voltage.

As described above, the first switch K1 and the second switch K2 are turned off when the corresponding controlled ports CP receive the second control signal with the low voltage, and the third switch K3 and the fourth switch K4 are turned on when the corresponding controlled ports CP receive the first control signal with the high voltage. Consequently, the earphone left channel output pin Lout1 and the earphone right channel output pin Rout1 of the audio amplifier 20 are respectively connected to the left channel pin L and the right channel pin R via the third switch K3 and the fourth switch K4 which are turned on.

At the same time, the audio amplifier 20 controls the earphone left channel output pin Lout1 and the earphone right channel output pin Rout1 to output the audio signals to the earphone port 10 when the detection port Det receives the second control signal with the low voltage from the first output port 51 of the earphone detection and response circuit 50. The audio signals output by the earphone left channel output pin Lout1 and the earphone right channel output pin Rout1 are transmitted to the left channel pin L and the right channel pin R of the earphone port 10. Thus, the electronic device 100 outputs the audio signals via the earphone 110.

In another embodiment, the first PNP BJT Q1 and the second PNP BJT Q2 can be replaced by P-channel metal-oxide semiconductor field-effect transistors.

The electronic device 100 can be any suitable electronic device having the earphone port 10, such as a mobile phone, a digital photo frame, an electronic reader, or a tablet computer.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device capable of being debugged via an earphone port, comprising:
    the earphone port configured to receive an earphone plug, wherein the earphone port comprises a left channel pin, a right channel pin, an earphone detection pin, and a ground pin;
    an audio amplifier comprising an earphone left channel output pin and an earphone right channel output pin;
    a digital processor comprising a data transmission pin and a data receive pin;
    a multi-way selection switch comprising a first switch, a second switch, a third switch, and a fourth switch, wherein, the first switch is electrically connected between the data transmission pin of the digital processor and the left channel pin of the earphone port, the second switch is electrically connected between the data receive pin of the digital processor and the right channel pin of the earphone port, the third switch is electrically connected between the earphone left channel output pin of the audio amplifier and the left channel pin of the earphone port, the fourth switch is electrically connected between the earphone right channel output pin of the audio amplifier and the right channel pin of the earphone port, each of the first switch, the second switch, the third switch, and the fourth switch comprises a controlled port; and
    an earphone detection and response circuit comprising a first output port connected to the controlled ports of the first switch and the second switch and a second output port connected to the controlled ports of the third switch and the fourth switch, wherein, the earphone detection and response circuit is configured to detect whether the earphone port receives the earphone plug, wherein, when the earphone detection and response circuit detects the earphone port does not receive the earphone plug, the earphone detection and response circuit outputs a first control signal to the controlled ports of the first switch and the second switch via the first output port to turn on the first switch and the second switch, and outputs a second control signal to the controlled ports of the third switch and the fourth switch via the second output port to turn off the third switch and the fourth switch.

2. The electronic device according to claim 1, wherein when the earphone detection and response circuit detects the earphone port receives the earphone plug, the earphone detection and response circuit outputs the second control signal to the controlled ports of the first switch and the second switch via the first output port to turn off the first switch and the second switch, and outputs the first control signal to the controlled ports of the third switch and the fourth switch via the second output port to turn on the third switch and the fourth switch.

3. The electronic device according to claim 2, further comprising a loudspeaker comprising audio input pins, wherein the audio amplifier further comprises a detection port, a loudspeaker left channel output pin, and a loudspeaker right channel output pin, the detection port is connected to the first output port of the earphone detection and response circuit; the loudspeaker left channel output pin and the loudspeaker right channel output pin of the audio amplifier are respectively connected to the audio input pins of the loudspeaker; the audio amplifier is configured to control the loudspeaker left channel output pin and the loudspeaker right channel output pin to output audio signals to the loudspeaker when the detection port receives the first control signal from the first output port of the earphone detection and response circuit.

4. The electronic device according to claim 3, wherein the audio amplifier is further configured to control the earphone left channel output pin and the earphone right channel output pin to output the audio signals to the earphone port when the detection port receives the second control signal from the first output port of the earphone detection and response circuit.

5. The electronic device according to claim 4, further comprising an earphone filtering circuit connected between the earphone left channel output pin, wherein the earphone right channel output pin of the audio amplifier and the third switch, the fourth switch, and is configured to filter the audio signals output by the earphone left channel output pin and the earphone right channel output pin of the audio amplifier.

6. The electronic device according to claim 2, wherein the earphone detection and response circuit comprises a first positive-negative-positive (PNP) bipolar junction transistor (BJT) and a second PNP BJT, an emitter of the first PNP BJT is grounded, a collector of the first PNP BJT is electrically connected to a voltage port via a first resistor, a base of the first PNP BJT is electrically connected to the earphone detection pin of the earphone port via a second resistor; an emitter of the second PNP BJT is grounded via a third resistor, a collector of the second PNP BJT is electrically connected to the voltage port via a fourth resistor, a base of the second PNP BJT is electrically connected to the earphone detection pin of the earphone port via a fifth resistor; the earphone detection pin of the earphone port is further connected to the voltage port via a sixth resistor.

7. The electronic device according to claim 6, wherein a connection node between the collector of the first PNP BJT and the first resistor constitutes the first output port of the earphone detection and response circuit; a connection node between the emitter of the second PNP BJT and the third resistor constitutes the second output port of the earphone detection and response circuit.

8. The electronic device according to claim 7, wherein when the earphone port does not receive the earphone plug, the earphone detection pin is at high voltage by obtaining the high voltage from the voltage port; when the earphone is received the earphone port, the earphone connects the earphone detection pin with the ground pin, and cause the earphone detection pin to be at low voltage.

9. The electronic device according to claim 8, wherein the first control signal output by the earphone detection and response circuit is a high-voltage signal, and the second control signal output by the earphone detection and response circuit is a low-voltage signal, the first switch, the second switch, the third switch, and the fourth switch are turned on when the controlled ports of them receive the high-voltage signal and are turned off when the controlled ports of them receive the low-voltage signal.

10. The electronic device according to claim 9, wherein when the earphone is not received the earphone port, the earphone detection pin at the high voltage, the bases of the first PNP BJT and the second PNP BJT obtain the high voltage from the earphone detection pin, and the first PNP BJT and the second PNP BJT are turned off accordingly; the first output port is electrically connected to the voltage port and at the high voltage, thus outputting the first control signal with the high voltage, the second output port is grounded via the third resistor and at the low voltage, thus outputting the second control signal with the low voltage.

11. The electronic device according to claim 9, wherein when the earphone is received the earphone port, the earphone detection pin is grounded via the earphone and at the low voltage, the bases of the first PNP BJT and the second PNP BJT obtain the low voltage from the earphone detection pin, thus the first PNP BJT and the second PNP BJT are turned on accordingly; the first output port is grounded via the first PNP BJT which is turned on and at the low voltage, thus outputting the second control signal with the low voltage; the second output port is electrically connected to the voltage port via the fourth resistor and the second PNP BJT which is turned on and at the high voltage, thus outputting the first control signal with the high voltage.

\* \* \* \* \*